US009454329B2

(12) United States Patent
Cox et al.

(10) Patent No.: US 9,454,329 B2
(45) Date of Patent: Sep. 27, 2016

(54) MIRRORING MEMORY COMMANDS TO MEMORY DEVICES

(75) Inventors: Christopher E. Cox, Placerville, CA (US); Rebecca Z. Loop, Hillsboro, OR (US); Christopher P. Mozak, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 262 days.

(21) Appl. No.: 13/997,399

(22) PCT Filed: Apr. 30, 2012

(86) PCT No.: PCT/US2012/035784
§ 371 (c)(1),
(2), (4) Date: Jun. 24, 2013

(87) PCT Pub. No.: WO2013/165350
PCT Pub. Date: Nov. 7, 2013

(65) Prior Publication Data
US 2014/0006729 A1    Jan. 2, 2014

(51) Int. Cl.
*G06F 12/00* (2006.01)
*G06F 3/06* (2006.01)
*G06F 13/16* (2006.01)
*G06F 13/38* (2006.01)

(52) U.S. Cl.
CPC .......... *G06F 3/0659* (2013.01); *G06F 3/0604* (2013.01); *G06F 3/0683* (2013.01); *G06F 13/161* (2013.01); *G06F 13/1684* (2013.01); *G06F 13/1694* (2013.01); *G06F 13/382* (2013.01); *Y02B 60/1228* (2013.01); *Y02B 60/1235* (2013.01)

(58) Field of Classification Search
CPC ... G06F 3/0659; G06F 3/0604; G06F 3/0683
See application file for complete search history.

(56) References Cited

U.S. PATENT DOCUMENTS

| | | | |
|---|---|---|---|
| 5,974,506 A * | 10/1999 | Sicola | G06F 12/0871 711/119 |
| 7,076,618 B2 * | 7/2006 | Dahlen et al. | 711/157 |
| 7,188,208 B2 * | 3/2007 | David et al. | 710/305 |
| 8,151,065 B2 * | 4/2012 | Imai et al. | 711/154 |
| 8,930,647 B1 * | 1/2015 | Smith | 711/154 |
| 2004/0172508 A1 * | 9/2004 | Nguyen et al. | 711/162 |
| 2011/0191542 A1 * | 8/2011 | Vash et al. | 711/130 |

OTHER PUBLICATIONS wikipedia.org, "Mobile DDR," 4 pages, printed Oct. 9, 2013.
International Searching Authority, Notification of Transmittal of the International Search Report and the Written Opinion of the International Searching Authority, mailed Dec. 20, 2012, in International application No. PCT/US2012/035784.

* cited by examiner

*Primary Examiner* — Reginald Bragdon
*Assistant Examiner* — Mehdi Namazi
(74) *Attorney, Agent, or Firm* — Trop, Pruner & Hu, P.C.

(57) ABSTRACT

In one embodiment, a system on a chip (SoC) includes a plurality of processor cores and a memory controller to control communication between the SoC and a memory coupled to the memory controller. The memory controller may be configured to send mirrored command and address signals to a first type of memory device and to send non-mirrored control and address signals to a second type of memory device. Other embodiments are described and claimed.

15 Claims, 8 Drawing Sheets

MIRRORING MEMORY COMMANDS TO MEMORY DEVICES

TECHNICAL FIELD

Embodiments relate to interconnection and control of memory devices.

BACKGROUND

Memory devices for a variety of computing systems are designed according to different standards. For example, different standards exist for memory devices primarily used in desktop systems and memory devices primarily used in low-power solutions.

Many memory devices are designed according to a Joint Electron Devices Engineering Council (JEDEC) standard. For example, many desktop and server systems use a double data rate (DDR)-based design. Typically these the systems are designed with a multi-drop memory bus to provide interconnection between system memory and a memory controller. Generally, these conventional DDR standards are referred to as "DDRx" standards.

In contrast, many low-power portable devices use memory devices in accordance with a low power DDR standard such as the current LPDDR2 standard according to JEDEC JESD 209-2E (published April 2009). Presently, a next generation LPDDR standard is being developed (referred to as LPDDR3) that will offer extensions to LPDDR2 to increase bandwidth. Generally, these low power standards are referred to as "LPDDRx" standards. Low-power-based memory designs differ from conventional DDR-based designs in various ways to enable operation at reduced power consumption levels. However, this can result in reduced speeds and lesser memory capacities.

The LPDDRx standards are designed for point-to-point low power solutions such as mobile phones, tablet computers, and other highly portable devices. Oftentimes, memory in these devices is implemented in a package-on-package (POP) package to enhance performance by providing the memory in close relation to a memory controller.

In contrast, conventional laptop/mobile platforms are designed with a multi-drop design, often with the memory not co-located with memory controller as in a POP package. As a result, significant signal integrity issues occur when using LPDDR-based memory in a multi-drop bus configuration such as a laptop computer, due to LPDDR command bus design limitations.

DETAILED DESCRIPTION

Figure 1:
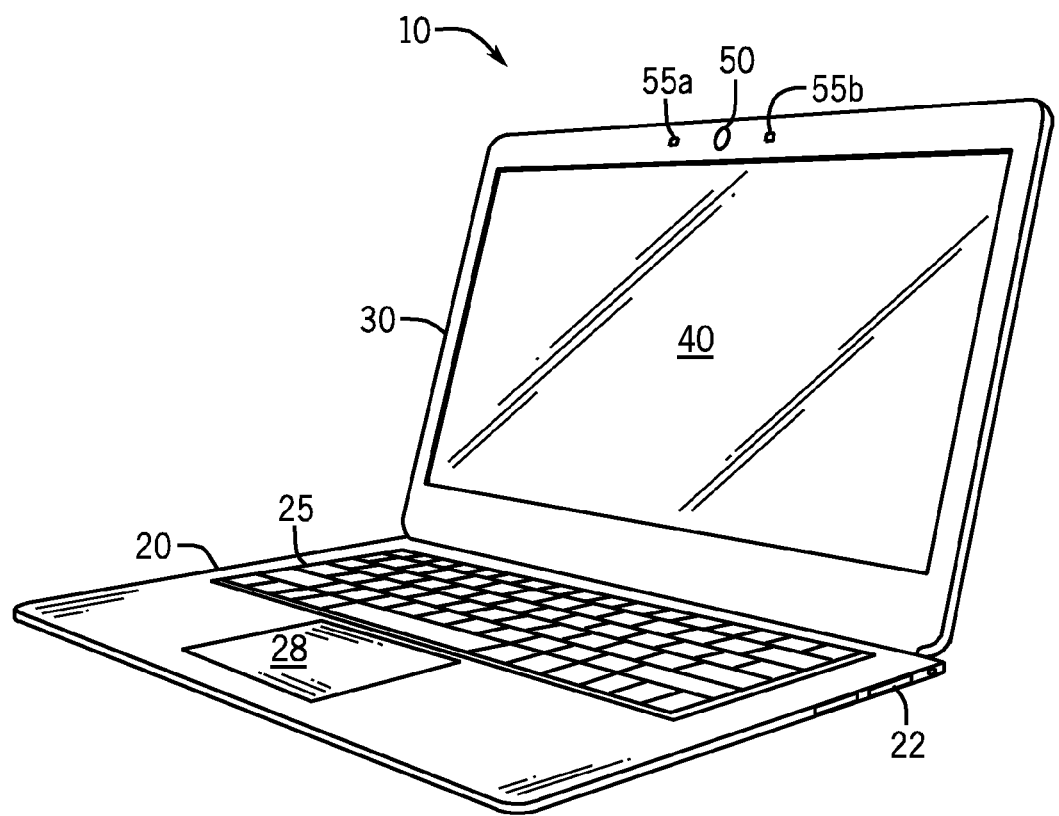
FIG. 1 is an illustration of a laptop computer in accordance with an embodiment of the present invention.

Embodiments may be used to dynamically and selectively communicate command and address signals to memory devices in a mirrored fashion. More specifically, embodiments can be used to enable a memory controller to be configured to communicate command and address information in a mirrored or non-mirrored manner depending on a desired system configuration. To this end, unused DDRx connection pins of a semiconductor device (generally referred to as "pins", even though it is understood that input/output (I/O) connections of a processor or other integrated circuit (IC) may be by way of conductive pads, bumps or according to other technologies) may be repurposed to mimic a point-to-point (PtP) solution by broadcasting at least selected ones of each command (CMD) signal across multiple discrete pins.

In some multi-drop interconnect systems, without enabling mirroring in accordance with an embodiment, the signal integrity impact due to the added capacitance loading and signal routing length would cause a memory system to operate at a lower speed. For example, without mirroring in accordance with an embodiment of the present invention, a memory system may operate at 1-2 speed bins below a target frequency, impacting overall system performance. This concern may be especially highlighted in certain memory package designs such as a quad die memory package (QDP).

According to current JEDEC standards (e.g., DDR3 according to the JESD79-3E standard (published July 2010)), a DDR-based memory subsystem may provide for 22 command/address pins as compared to 10 pins for a LPDDRx-based memory system. Thus by default, a configurable design that enables interconnection to a DDR-based memory or an LPDDR-based memory may include 13 available command pins when operating in LPDDRx mode. Although described herein with regard to these specific numbers of command and address pins and the particular DDR and LPDDR standards, understand the scope of the present invention is not limited in this regard and in other embodiments, and greater or fewer numbers of available command and data pins and different memory designs may be present. Furthermore understand that any type of signal can be mirrored on unused pins to emulate a PtP interconnect.

Embodiments may provide logic in a system on chip (SoC), processor or other semiconductor device including a memory controller that controls the output mode of the command bus to enable switching between non-mirrored and mirrored command and address outputs as desired. In some embodiments, this control may be implemented using a setting obtained from a basic input output system (BIOS), and which may be stored in a configuration register such as a memory mapped input/output register. Note also that this setting can be realized via fuses, system straps, or so forth.

Even in certain platforms that use LPDDRx or another low power memory design, a non-mirrored mode (implemented as a single command interconnect structure) may be used to provide lower frequency and lower loading cases. In this way, the power consumption of additional (e.g., 10) output drivers can be avoided and board routing can be simplified. In LPDDRx mirrored mode, provided via the additional command bus set, a point-to-point connection between the controller and each of multiple memory devices, a better electrical solution may be realized. In this way, a semiconductor device having memory controller functionality can be of a combinated DDR/LPDDR design to provide more scalable power vs. costs within the same silicon.

Before describing various implementations, a discussion of an example system in which memory in accordance with an embodiment of the present invention is provided. Referring now to FIG. 1, shown is an illustration of a laptop computer in accordance with an embodiment of the present invention. Various commercial implementations of system 10 can be provided. For example, system 10 can correspond to an Ultrabook™, an Apple MacBook Air™, or another ultralight and thin laptop computer (generally an ultrathin laptop). Further, as will be described herein, in some embodiments this laptop computer can be configurable to be convertible into a tablet computer.

With reference to FIG. 1, system 10 includes a base portion 20 which may be configured via a lightweight chassis that can include substantially all of the electronics circuitry of the system. For user interfaces, a keyboard 25 and a touchpad 28 may be provided in base portion 20. In addition, various ports for receiving peripheral devices, such as universal serial bus (USB) ports (including a USB 3.0 port), a thunderbolt port, wide ports such as a micro high definition media interface (HDMI) mini video graphics adapter (VGA), memory card ports such as a SD card port, audio jack, among others may be present, generally indicated at location 22 on a side of the chassis (other user-accessible ports can be present on the opposing chassis side). In addition, a power port may be provided to receive DC power via an AC adapter (not shown in FIG. 1).

As further seen, a lid portion 30 may be coupled to base portion 20 and can include a display 40, which in different embodiments can be a liquid crystal display (LCD) or an organic light emitting diode (OLED). Furthermore, in the area of display 40, touch functionality may be provided such that a user can provide user input via a touch panel co-located with display 40. Lid portion 30 may further include various capture devices, including a camera device 50, which may be used to capture video and/or still information. In addition, dual microphones $55_a$ and $55_b$ may be present to receive user input via the user's voice. Although shown at this location in FIG. 1, the microphone, which can be one or more omnidirectional microphones, may be in other locations.

As will be described further below, system 10 may be configured with particular components and circuitry to enable a high end user experience via a combination of hardware and software of the platform. For example, using available hardware and software, perceptual computing can enable a user to interconnect with the system via voice, sensitive, touch and in other ways. In addition, this user experience can be delivered in a very light and thin form factor system that provides high performance and low-power capabilities while also enabling advanced features such as instant on and instead connect so that the system can be placed into low power, e.g., sleep mode and directly awaken and be available to the user instantly (e.g., within two seconds of exiting the sleep mode). Furthermore upon such wake-up the system may be connected to networks such as the Internet, providing similar performance to that available in smartphones and tablet computers, which lack the processing and user experience of a fully featured system such as that of FIG. 1. Of course, although shown at this high level in the illustration of FIG. 1, understand that additional components are present within the system, such as loud speakers, additional displays, capture devices, environmental sensors and so forth, details of which are discussed further below.

Figure 2:
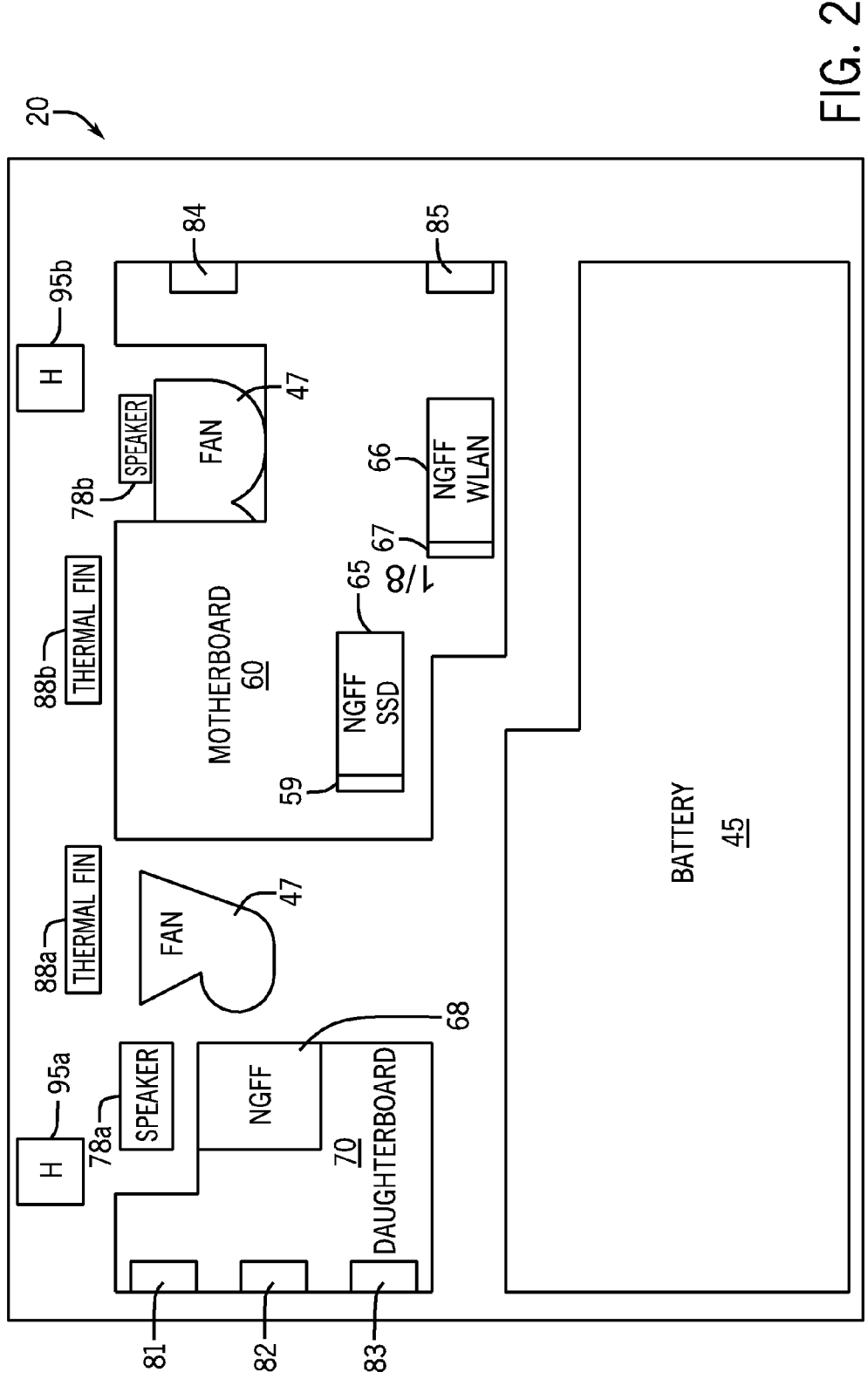
FIG. 2 is a top view of the placement of certain components within a base portion of a chassis in accordance with an embodiment of the present invention.

Referring now to FIG. 2, shown is a top view of the placement of certain components within a base portion of a chassis in accordance with an embodiment of the present invention. As shown in FIG. 2, base portion 20 can include substantially all of the electronics of the system, other than those associated with the display panel and any touch screen. Of course, the view shown in FIG. 2 is an example only, and understand that different arrangements of components, including different components, different sizes and locations of components and other placement issues can certainly occur in other embodiments.

In general, the view in FIG. 2 is of the components within a chassis, other than a keyboard and touch pad which would generally be adapted over the components shown in FIG. 2 (with the keyboard over an upper portion of the view in FIG. 2, and the keypad generally in a lower and central portion of the view in FIG. 2).

Much of the circuitry of the system can be implemented on a motherboard 60 which can include various integrated circuits (ICs) and other circuitry including a processor such as a central processing unit (CPU), system memory and other ICs. Additional ICs and other circuitry can be implemented on a daughterboard 70 that may couple to motherboard 60. Daughterboard 70 can include interfaces to various ports and other peripheral connectors, including ports 81, 82 and 83 which may correspond to, e.g., USB, Ethernet, Firewire, Thunderbolt, or any other type of user-accessible connection. As seen, an add-in card 68 may couple to daughterboard 70, e.g., via a NGFF connector. In the embodiment shown, this add-in card 68 may include wireless connectivity circuitry, e.g., for 3G/4G/LTE circuitry.

Similarly, motherboard 60 may provide interconnection to certain other user accessible ports, namely ports 84 and 85. In addition, several add-in cards 65 and 66 may couple to motherboard 60. In the embodiment shown, add-in card 65 may include an SSD and can couple to motherboard via a NGFF connector 59. Add-in card 66 may include, e.g., WLAN circuitry and can also be connected via a NGFF connector 67.

To provide cooling, some implementations may include one or more fans. In the embodiment shown, two such fans 47 may be provided which can be used to conduct heat from the CPU and other electronics and out via thermal fans $88_a$ and $88_b$, e.g., to vents within the chassis or to the chassis directly. However other embodiments may provide for a fanless system where cooling can be achieved by a combination of reduction in power consumption of the CPU and other components, and heat dissipation elements to couple hot components to the chassis or other ventilation elements.

To provide for advanced audio features, multiple speakers $78_a$ and $78_b$ may be provided and which can radiate out from a top portion of the chassis via a mesh or other ventilated pattern to provide for an enhanced sound experience. To enable interconnection between base portion 20 and a lid portion (not shown for ease of illustration in FIG. 2), a pair of hinges $95_a$ and $95_b$ may be provided. In addition to providing hinge capabilities, these hinges may further include pathways to provide connections between circuitry within the lid portion and base portion 20. For example, wireless antennas, touch screen circuitry, display panel circuitry and so forth all can communicate via connectors adapted through these hinges. As further shown, a battery 45 may be present which can be a lithium-ion or other high capacity battery may be used. Although shown with this particular implementation of components and placement of circuitry in FIG. 2, understand the scope of the present invention is not limited in this regard. That is, in a given system design there can be trade offs to more efficiently consume the available X-Y space in the chassis.

Figure 3:
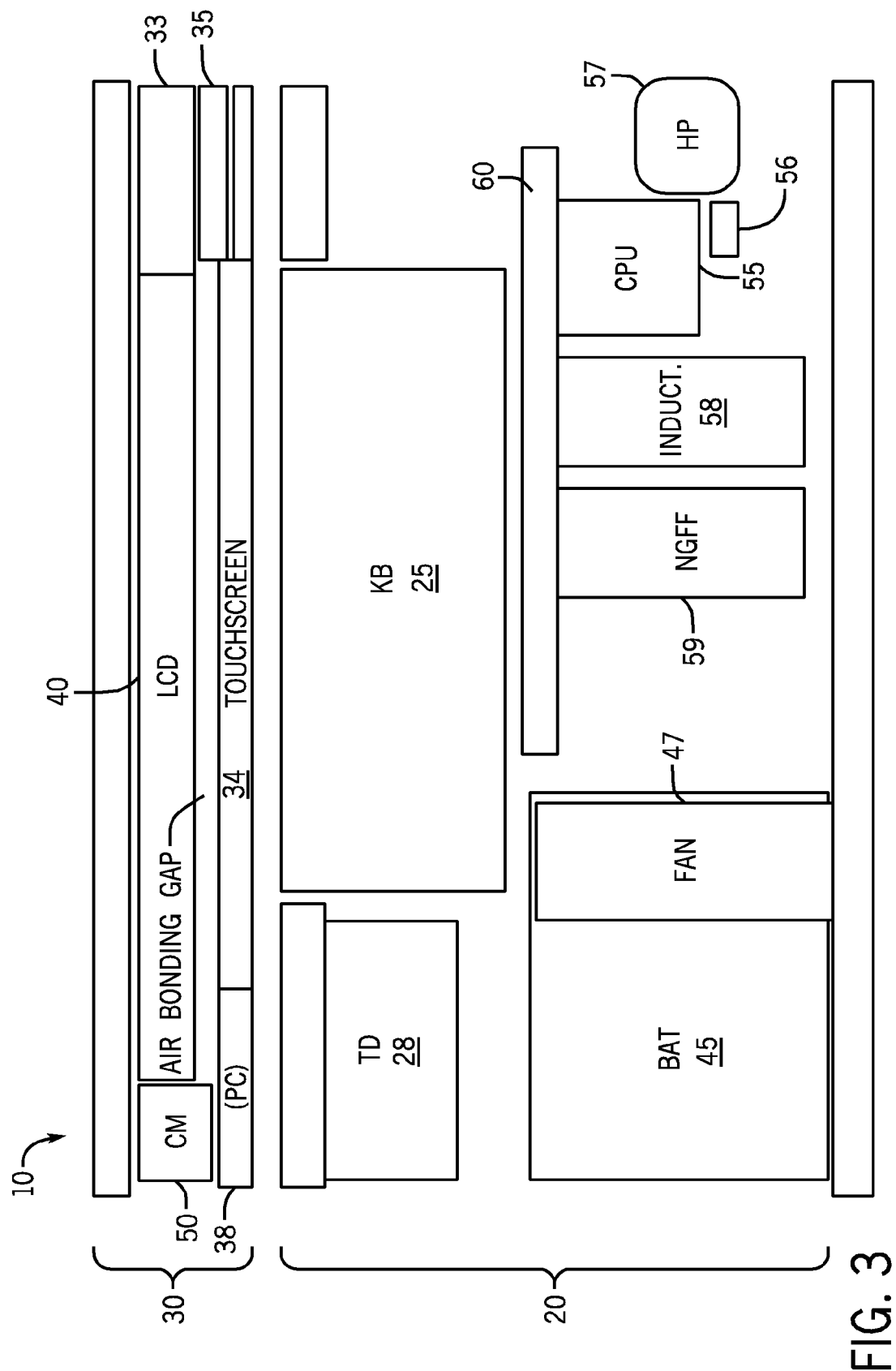
FIG. 3 is a cross-sectional view of a computer system in accordance with an embodiment of the present invention.

Referring now to FIG. 3, shown is a cross-sectional view of a computer system in accordance with an embodiment of the present invention. As shown in FIG. 3, system 10 may correspond to a clamshell-based ultrathin laptop computer having a low-profile and lightweight design. The view in FIG. 3 is a cross-sectional view through a substantial midpoint of the system and is intended to show a high level view of the vertical stack-up or layout of components within the chassis.

In general, the chassis may be split into a lid portion 30 and a base portion 20. In general, lid portion 30 may include the display and related circuitry and components, while base portion 20 may include the main processing elements along with battery and keyboard. However, note that in other implementations of a clamshell design, virtually all of the components other than the keyboard can be adapted within the lid portion to enable a detachable and removable lid portion that doubles as a tablet-based form factor computer.

With regard to lid portion 30, included is a display panel 40 which in an embodiment can be a LCD or other type of thin display such as an OLED. Display panel 40 may be coupled to a display circuit board 33. In addition, a touch screen 34 may be adapted above display panel 40 (when lid portion is in an open portion, but shown below display panel 40 in the illustration of FIG. 3). In an embodiment, touch screen 34 can be implemented via a capacitive sense touch array configured along a substrate, which can be a glass, plastic or other such transparent substrate. In turn, touch screen 34 can be coupled to a touch panel circuit board 35.

As further seen, also within lid portion 30 may be a camera module 50 which in an embodiment can be a high definition camera capable of capturing image data, both of still and video types. Camera module 50 can be coupled to a circuit board 38. Note that all of these components of lid portion 30 may be configured within a chassis that includes a cover assembly that can be fabricated from a plastic or metal material such as a magnesium aluminum (Mg—Al) composite.

Still referring to FIG. 3, the majority of the processing circuitry of system 10 may be present within base portion 20. However, as discussed above in an embodiment that provides for a detachable lid portion, virtually all of these components can instead be implemented in the lid portion.

From view of the top of base portion 20 down, included is a keyboard 25 that can be of various types to enable a thin profile device and can include chicklet type keys or other thin form factor keys. In addition, a touch pad 28 may provide another user interface.

The majority of the components can be configured on a circuit board 60 which may be a motherboard that includes various integrated circuits that can be adapted to the circuit board in a variety of manners, including soldered, surface mounted and so forth. With specific reference to FIG. 3, a CPU 55, which may be an ultra low voltage multicore processor, can be adapted to circuit board 60, e.g., via a socket or other type of connection. As seen, to provide a thermal solution, a heat sink 56 may be placed in close relation to CPU 55 and can in turn be coupled to a heat pipe 57, which can be used to transfer heat from the processor and/or other components, e.g., to various cooling locations such as vents, fans or so forth. Also shown configured to circuit board 60 is an inductor 58 and a next generation form factor (NGFF) edge connector 59. Those connectors in accordance with a NGFF design may provide a single connection type that can be used for add-in cards of different sizes with potentially different keying structures to ensure only appropriate add-in cards are inserted into such connectors. Although not shown for ease of illustration, understand that an add-in card can be configured to connector 59 to provide additional components that can be configured for a particular system. As examples, these components can include wireless solutions and a solid state device (SSD), among other types of peripheral devices. Additional add-in cards may be provided in some implementations.

As further seen in FIG. 3, a battery 45 may further be configured within base portion 20 and may be located in close connection to a portion of the cooling solution which can be implemented in one embodiment by one or more fans 47. Although shown with this particular implementation in the example of FIG. 3, understand the scope of the present invention is not limited in this regard as in other embodiments additional and different components can be present. For example, instead of providing mass storage by way of an SSD, a hard drive can be implemented within base portion 40. To this end, a mini-serial advanced technology attach (SATA) connector can further be coupled to circuit board 60 to enable connection of this hard drive to the processor and other components adapted on circuit board 50. Furthermore, different locations of components can occur to more efficiently use (or reduce) the Z-space.

Figure 4:
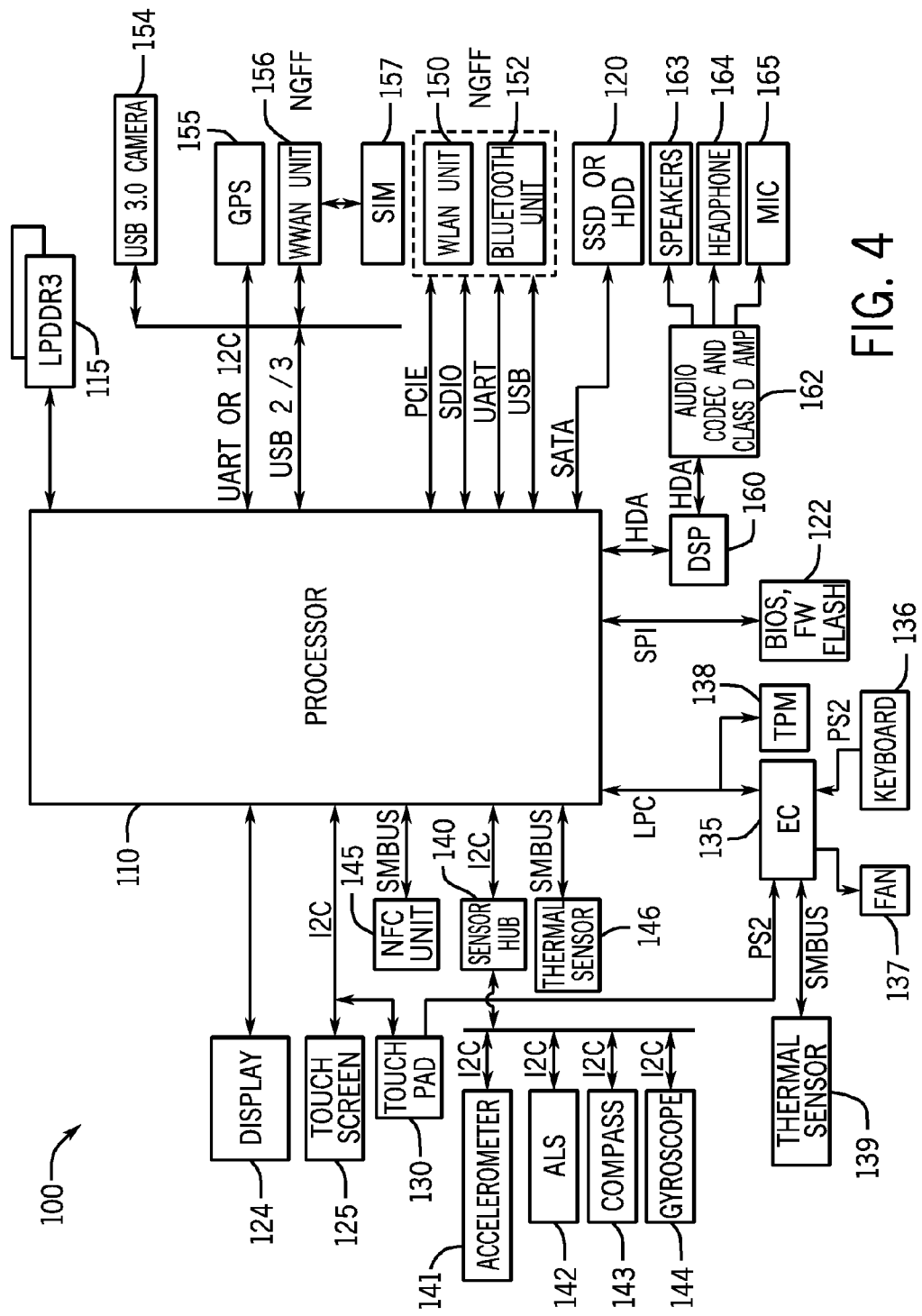
FIG. 4 is a block diagram of components present in a computer system in accordance with an embodiment of the present invention.

Referring now to FIG. 4, shown is a block diagram of components present in a computer system in accordance with an embodiment of the present invention. As shown in FIG. 4, system 100 can include many different components. These components can be implemented as ICs, portions thereof, discrete electronic devices, or other modules adapted to a circuit board such as a motherboard or add-in card of the computer system, or as components otherwise incorporated within a chassis of the computer system. Note also that the block diagram of FIG. 4 is intended to show a high level view of many components of the computer system. However, it is to be understood that additional components may be present in certain implementations and furthermore, different arrangement of the components shown may occur in other implementations.

As seen in FIG. 4, a processor 110, which may be a low power multicore processor socket such as an ultra low voltage processor, may act as a main processing unit and central hub for communication with the various components of the system. In one embodiment, processor 110 may be an Intel® Architecture Core™-based processor such as an i3, i5, i7 or another such processor available from Intel Corporation, Santa Clara, Calif. However, understand that other low power processors such as available from Advanced Micro Devices, Inc. (AMD) of Sunnyvale, Calif., an ARM-based design from ARM Holdings, Ltd. or a MIPS-based design from MIPS Technologies, Inc. of Sunnyvale, Calif., or their licensees or adopters may instead be present in other embodiments. Certain details regarding the architecture and operation of processor 110 in one implementation will be discussed further below.

Processor 110 may communicate with a system memory 115, which in an embodiment can be implemented via multiple memory devices such as low power double data rate (LPDDR) devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 that will offer extensions to LPDDR2 to increase bandwidth. As examples, 2/4/8 gigabytes (GB) of system memory may be present and can be coupled to processor 110 via a memory interconnects. In various implementations the individual memory devices can be of different package types such as single die package (SDP), dual die package (DDP) or quad die package (QDP). These devices can in some embodiments be directly soldered onto a motherboard to provide a lower profile solution, while in other embodiments, the devices can be configured as one or more memory modules that in turn can couple to the motherboard by a given connector.

To provide for persistent storage of information such as data, applications, one or more operating systems and so forth, a mass storage 120 may also couple to processor 110. In various embodiments, to enable a thinner and lighter system design as well as to improve system responsiveness, this mass storage may be implemented via a SSD. However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 4, a flash device 122 may be coupled to processor 110, e.g., via a serial peripheral interface (SPI). This flash device may provide for non-volatile storage of system software, including a basic input/output software (BIOS) as well as other firmware of the system.

Various input/output (IO) devices may be present within system 100. Specifically shown in the embodiment of FIG. 4 is a display 124 which may be a high definition LCD or LED panel configured within a lid portion of the chassis. This display panel may also provide for a touch screen 125, e.g., and adapted externally over the display panel such that via a user's interaction with this touch screen, user inputs can be provided to the system to enable desired operations, e.g., with regard to the display of information, accessing of information and so forth. In one embodiment, display 124 may be coupled to processor 110 via a display interconnect can be implemented as a high performance graphics interconnect. Touch screen 125 may be coupled to processor 110 via another interconnect, which in an embodiment can be an I$^2$C interconnect. As further shown in FIG. 4, in addition to touch screen 125, user input by way of touch can also occur via a touch pad 130 which may be configured within the chassis and may also be coupled to the same I$^2$C interconnect as touch screen 125.

For perceptual computing and other purposes, various sensors may be present within the system and can be coupled to processor 110 in different manners. Certain inertial and environmental sensors may couple to processor 110 through a sensor hub 140, e.g., via an I$^2$C interconnect. In the embodiment shown in FIG. 4, these sensors may include an accelerometer 141, an ambient light sensor (ALS) 142, a compass 143 and a gyroscope 144. Other environmental sensors may include one or more thermal sensors 146 which may couple to processor 110 via a system management bus (SMBus) bus, in one embodiment.

Also seen in FIG. 4, various peripheral devices may couple to processor 110 via a low pin count (LPC) interconnect. In the embodiment shown, various components can be coupled through an embedded controller 135. Such components can include a keyboard 136 (e.g., coupled via a PS2 interface), a fan 137, and a thermal sensor 139. In some embodiments, touch pad 130 may also couple to EC 135 via a PS2 interface. In addition, a security processor such as a trusted platform module (TPM) 138 in accordance with the Trusted Computing Group (TCG) TPM Specification Version 1.2, dated Oct. 2, 2003 may also couple to processor 110 via this LPC interconnect.

System 100 can communicate with external devices in a variety of manners, including wirelessly. In the embodiment shown in FIG. 4, various wireless modules, each of which can correspond to a radio configured for a particular wireless communication protocol, are present. One manner for wireless communication in a short range such as a near field may be via a near field communication (NFC) unit 145 which may communicate, in one embodiment with processor 110 via an SMBus. Note that via this NFC unit 145, devices in close proximity to each other can communicate. For example, a user can enable system 100 to communicate with another (e.g.,) portable device such as a smartphone of the user via adapting the two devices together in close relation and enabling transfer of information such as identification information payment information, data such as image data or so forth. Wireless power transfer may also be performed using a NFC system.

As further seen in FIG. 4, additional wireless units can include other short range wireless engines including a wireless local area network (WLAN) unit 150 and a Bluetooth unit 152. Using WLAN unit 150, Wi-Fi™ communications in accordance with a given Institute of Electrical and Electronics Engineers (IEEE) 802.11 standard can be realized, while via Bluetooth unit 152, short range communications via a Bluetooth protocol can occur. These units may communicate with processor 110 via, e.g., a USB link or a universal asynchronous receive transmitter (UART) link. Or these units may couple to processor 110 via an interconnect via a Peripheral Component Interconnect Express™ (PCIe™) protocol in accordance with the PCI Express™ Specification Base Specification version 3.0 (published Jan. 17, 2007), or another such protocol such as a serial data input/output (SDIO) standard. Of course, the actual connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit 156 which in turn may couple to a subscriber identity module (SIM) 157. In addition, to enable receipt and use of location information, a GPS module 155 may also be present. Note that in the embodiment shown in FIG. 4, WWAN unit 156 and an integrated capture device such as a camera module 154 may communicate via a given USB protocol such as a USB 2.0 or 3.0 link, or a UART or I$^2$C protocol. Again the actual connection of these units can be via adaptation of a NGFF add-in card to an NGFF connector configured on the motherboard.

To provide for audio inputs and outputs, an audio processor can be implemented via a digital signal processor (DSP) 160, which may couple to processor 110 via a high definition audio (HDA) link. Similarly, DSP 160 may communicate with an integrated coder/decoder (CODEC) and amplifier 162 that in turn may couple to output speakers 163 which may be implemented within the chassis. Similarly, amplifier and CODEC 162 can be coupled to receive audio inputs from a microphone 165 which in an embodiment can be implemented via dual array microphones to provide for high quality audio inputs to enable voice-activated control of various operations within the system. Note also that audio outputs can be provided from amplifier/CODEC 162 to a headphone jack 164. Although shown with these particular components in the embodiment of FIG. 4, understand the scope of the present invention is not limited in this regard.

Using the various inertial and environmental sensors present in a platform, many different use cases can be realized. These use cases enable advanced computing operations including perceptual computing and also allow for enhancements with regard to power management/battery life, security, and system responsiveness.

For example with regard to power management/battery life issues, based at least on part on information from an ambient light sensor, the ambient light conditions in a location of the platform can be determined and intensity of the display controlled accordingly. Thus, power consumed in operating the display can be reduced in certain light conditions.

As to security operations, based on context information obtained from the sensors such as location information, it can be determined whether a user is allowed to access certain secure documents. For example, a user may be permitted to access such documents at a work place or a home location. However, the user may be prevented from accessing such documents when the platform is present at a public location. This determination can be based on location information, e.g., determined via a GPS sensor. Other security operations may include providing for pairing of devices within a close range of each other, e.g., a portable platform as described herein and a user's desktop computer, mobile telephone or so forth. Certain sharing can be realized via near field communication when these devices are so paired. However, when the devices exceed a certain range, such sharing can be disabled. Furthermore, when pairing a platform as described herein and a smartphone, an alarm can be configured to be triggered when the devices travel more than a predetermined distance from each other, when in a public location. In contrast, when these paired devices are in a safe location, e.g., a work place or home location, the devices may exceed this predetermined limit without triggering such alarm.

Responsiveness can also be enhanced using the sensor information. For example, even when a platform is in a low power state, the sensors may still be enabled to run at a relatively low frequency. Accordingly, any changes in a location of the platform, e.g., as determined by inertial sensors, GPS sensor or so forth can be determined. If no such changes have been registered, a faster connection to a previous wireless hub such as a Wi-Fi™ access point or similar wireless enabler can occur, as there is no need to scan for available wireless network resources in this case. Thus a greater level of responsiveness when waking from a low power state can occur.

It is to be understood that many other use cases can be enabled using sensor information obtained via the integrated sensors within a platform as described herein, and the above examples are only for purposes of illustration.

Referring now to Table 1, shown is an example remapping of DDRx CMD pins to two sets of LPDDRx pins, annotated with a 1 or 2, in accordance with one embodiment of the present invention. Note that although shown with this example mapping, understand that other remappings are equally possible.

TABLE 1

| DDR3/DDR3L Command And Control (CAC) Signal | LPDDR3 CAC Mapping | DDR3/DDR3L Command And Control (CAC) Signal | LPDDR3 CAC Mapping |
|---|---|---|---|
| CKE[0] | CKE[0] | CLK_P[0] | CLK_P[0] |
| CKE[1] | CKE[1] | CLK_N[0] | CLK_N[0] |
| MA[15] | CAA_1_[8] | CLK_P[1] | CLK_P[1] |
| BA[2] | CAA_1_[5] | CLK_N[1] | CLK_N[1] |
| MA[14] | CAA_1_[9] | MA[10] | CAA_2_[7] |
| MA[12] | CAA_1_[6] | BA[1] | CAA_2_[6] |
| MA[11] | CAA_1_[7] | BA[0] | CAA_2_[4] |
| MA[9] | CAA_1_[1] | RAS_N | CAA_2_[3] |
| MA[7] | CAA_1_[4] | WE_N | CAA_2_[2] |
| MA[8] | CAA_1_[3] | CS_N[0] | CS_N[0] |
| MA[6] | CAA_1_[2] | CAS_N | CAA_2_[1] |
| MA[5] | CAA_1_[0] | ODT[0] | ODT[0] |
| MA[4] | NA | MA[13] | CAA_2_[0] |
| MA[3] | NA | CS_N[1] | CS_N[1] |
| MA[2] | CAA_2_[5] | CKE[2] | CKE[2] |
| MA[1] | CAA_2_[8] | CKE[3] | CKE[3] |
| MA[0] | CAA_2_[9] | | |

As seen, the DDR3 command and control signals, memory address (MA) and bank address (BA), row access strobe (RAS), and column address strobe (CAS) signals can be repurposed to provide two sets of command and address signals (CAA) for LPDDRx. Note in this example there are no changes for certain other control signals (e.g., clock, clock enable and termination signals).

Figure 5:
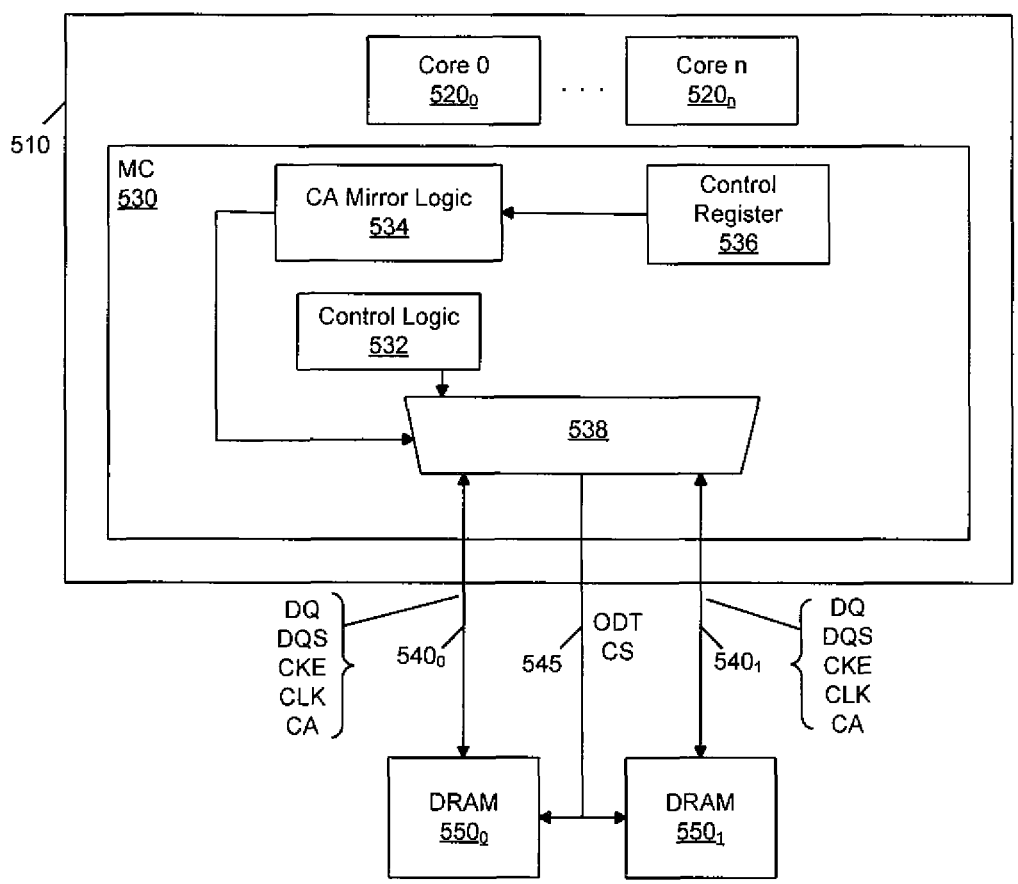
FIG. 5 is a block diagram of a portion of a system in accordance with an embodiment of the present invention.

Referring now to FIG. 5, shown is a block diagram of a portion of a system in accordance with an embodiment of the present invention. As shown in FIG. 5, system 500 includes a processor 510 which may be a low power multicore processor including a plurality of cores $520_0$-$520_n$. These cores may be homogeneous cores such as Intel® Core™-based cores, Intel® Atom™-based cores, other x86-type cores, ARM-based cores, or other reduced instruction set computing (RISC) processors. In other implementations, a mix of heterogeneous cores may be present, e.g., with some relatively small in-order cores and some larger out-of-order cores such that when reduced processing requirements are present, the in-order cores can be used to reduce power consumption.

As further seen in FIG. 5, processor 510 may include an integrated memory controller 530. This memory controller may be part of an uncore or system agent circuitry that can include other components such as various interfaces, power controllers and so forth. However, for ease of illustration only memory controller 530 is shown. Memory controller 530 may communicate with a system memory which in the embodiment of FIG. 5 may be dynamic random access memory (DRAM) $550_0$-DRAM $550_1$ implemented as individual memory devices affixed to a motherboard, e.g., via soldering. Or these devices can be realized as multi-chip packages or package-on-package DRAMS. The system memory can be a LPDDRx-based or other low power memory. Furthermore understand that in other implementations, the memory can be implemented as one or more memory modules such as a dual in-line memory module (DIMM) or a single in-line memory module (SIMM). In the implementation shown, only a single channel of memory is shown for ease of illustration. Understand that in certain implementations, multiple memory channels can be provided and may be coupled between memory controller 530 and system memory 550.

As further seen in FIG. 5, memory controller 530 includes a command and address (CA) mirror logic 534 which can be used to control generation and output of command information to an attached memory. More specifically, based on information in a control register 536, mirror logic 534 can control an output multiplexer 538 to output command signals received from a control logic 532 in a mirrored or non-mirrored configuration. Thus in a system having, e.g., LPDDRx memory devices, mirrored copies of at least certain command information can be sent on a first PtP interconnect and a second PtP interconnect to individual units of the memory. Instead in a system using, e.g., DDR-based memory, a single command set can be sent via a multi-drop memory interconnect.

Thus to enable memory connectivity with reduced system loading and enabling a desired speed of memory, mirrored command and address buses may be provided to the system memory. More specifically, multiple PtP memory interconnects $540_0$ and $540_1$ may couple between memory controller 530 and memory devices 550. These point-to-point memory interconnects can provide for mirrored command and address communication, in addition to communication of data information and other control information. Specifically, interconnect $540_0$ can provide for various lanes of communication with memory device $550_0$, including data lanes (e.g., 32 lanes of data) via data lanes DQ, a data strobe signal (DQS), a clock enable signal (CKE), a clock signal (CLK), and the mirrored command and address signals (CA). Similar signals may be communicated on memory interconnect $540_1$ to memory device $550_1$. Thus in the embodiment shown, directly connected data and control signals are provided to each memory device, with most of the control signals being mirrored to both devices.

In addition, the two memory devices also may be coupled to memory controller 530 via a common interconnect 545, which may be implemented via a T-topology that can be used to communicate on die termination (ODT) and chip select (CS) signals. However, note that no other command and address signals are on this shared interconnect since the individual command and address signals are mirrored to both memory devices via their associated PtP interconnect.

Embodiments may realize this mirroring of command and address signals, since processor 510 may be configured to include sufficient input/output connections (e.g., pins or pads) that may be present for a different type of system memory that uses greater numbers of command and address signals. For example, processor 510 may be configured to include sufficient number of memory signals to provide for system memory via a DDRx protocol that uses greater numbers of signals than a LPDDRx protocol.

In an embodiment, processor 510 can be dynamically configured to be enabled (or not) for this mirroring of command and address signals, e.g., as determined based on a system setting such as a BIOS setting. Accordingly, much greater flexibility is provided in the processor as it can be coupled to different types of memory configurations, e.g., including DDRx and LPDDRx memories.

Figure 6:
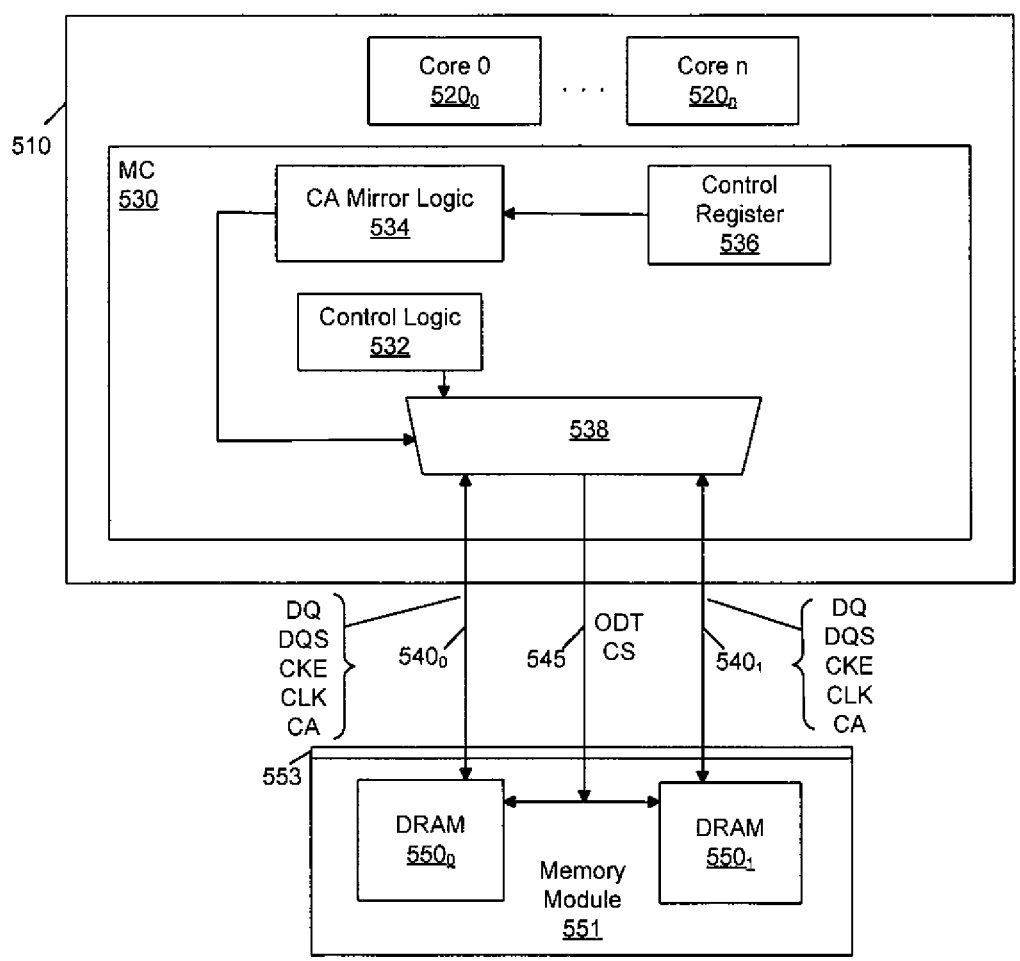
FIG. 6 is a block diagram of a portion of a system in accordance with another embodiment of the present invention.

FIG. 6 shows the same arrangement of FIG. 5 but in system 500' of FIG. 6, the memory is implemented with a memory module. That is, by mirroring command signals in accordance with an embodiment of the present invention, a LPDDRx-based memory module can be implemented. Other than the fact that in FIG. 6, the memory is implemented via a module 551 coupled to a motherboard via a memory connector 553, the arrangement is the same, in that multiple mirrored PtP interconnects are each coupled to a DRAM memory device 550 of module 551, along with the shared ODT and CS signals via a T-connected interconnect provided to both DRAM devices.

Figure 7:
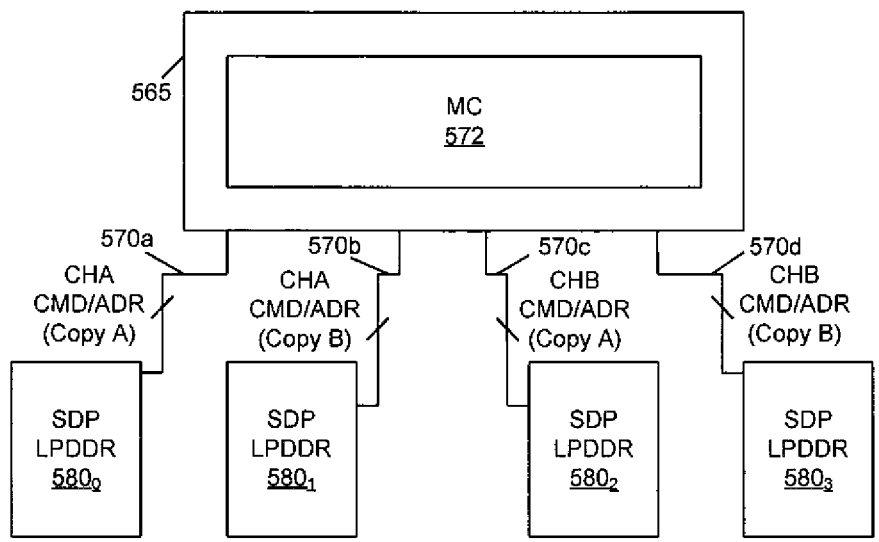
FIG. 7 is a block diagram of a portion of a system in accordance with yet another embodiment of the present invention.

Referring now to FIG. 7, shown is a block diagram further illustrating the mirrored command and address buses in accordance with an embodiment of the present invention. As shown in FIG. 7, a portion of a system 560 is shown that includes a processor 565, which may be configured similarly to that of processor 510 of FIG. 5. For ease of illustration, only an integrated memory controller 572 is shown within this processor.

Memory controller 572 may communicate command and address information with a set of memory devices $580_0$-$580_3$ which in the illustration of FIG. 7 are single die package (SDP) LPDDR memory devices, via interconnects $570_a$-$570_d$. Thus FIG. 7 shows an implementation in which two independent channels of memory, namely a first memory channel including memory devices $580_0$ and $580_1$ and a second memory channel including memory devices $580_2$-$580_3$, are present. As seen, mirrored command and address information (shown as copy A and copy B) are provided to each of the devices of the same memory channel. However note that independent command and address information is provided between memory controller 572 and the memory devices of the different channels.

Figure 8:
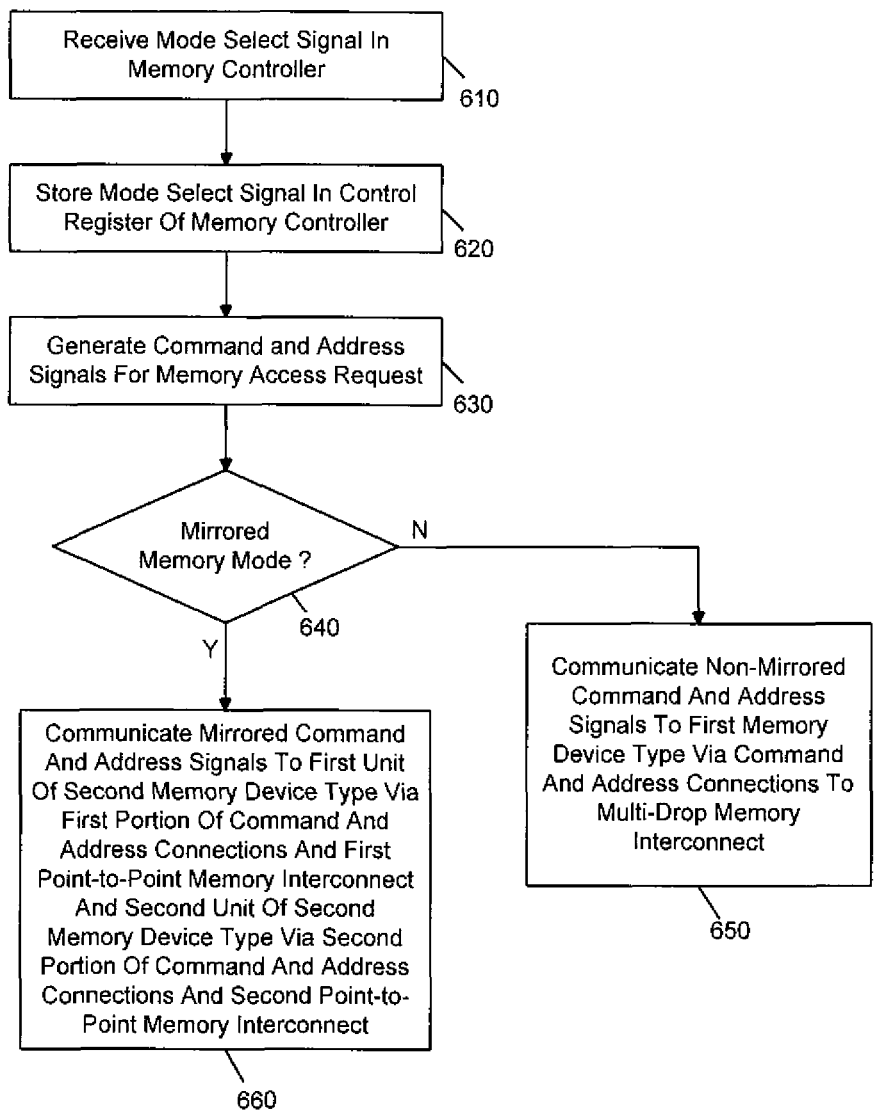
FIG. 8 is a flow diagram of a method for handling memory requests in accordance with an embodiment of the present invention.

Referring now to FIG. 8, shown is a flow diagram of a method for providing mirrored or non-mirrored commands to a memory in accordance with an embodiment of the present invention. As shown in FIG. 8, method 600 can be performed in a controller such as a memory controller coupled to a memory. Method 600 begins by receiving a mode select signal in the memory controller (block 610). For example, this mode select signal can be received on power up of the system, e.g. during BIOS execution. Control next passes to block 620 where the signal can be stored in a control register of the memory controller. Accordingly at this time, the memory controller is ready to perform memory requests during normal operation.

As further seen in FIG. 8, at block 630 command and address signals can be generated for a given memory access request. Then it can be determined at diamond 640 whether a mirrored memory mode is enabled. This determination can be based on the setting in the control register. If the mirrored memory mode is not enabled, control passes to block 650 where non-mirrored command and address signals can be sent to a first memory device type (e.g., a DDRx-based memory). More specifically, these command and address signals can be sent via a set of pins of the processor dedicated to such command and address signals. For a DDR memory system, the command and address signals can be sent along all of these connections to the memory via a multi-drop memory interconnect.

Instead if the arrangement is for a mirrored memory mode, control passes to block 660. There, mirrored command and address signals can be sent to different units of a second memory device type (e.g., an LPDDRx memory). More specifically a first set of these command and address signals can be sent via a first portion of the available command and address connections via a first PtP memory interconnect. And, a mirrored copy of this first set of command and address signals can be sent via a second portion of the command and address connections via a second PtP memory interconnect. Although shown at this high level in this implementation, understand the scope of the present invention is not limited this regard.

The following examples pertain to further embodiments. In one aspect, a system on a chip (SoC) includes a plurality of processor cores and a memory controller to control communication between the SoC and a memory coupled to the memory controller, where the memory controller is to send mirrored command and address signals to a first type of memory device and to send non-mirrored control and address signals to a second type of memory device.

The SoC can include a plurality of command and address connections to couple to the second type of memory device via a multi-drop memory interconnect. In turn, the memory controller includes a selector to selectively couple the command and address signals to the second memory device type via the plurality of command and address connections. In turn, a first portion of the command and address connections are to couple to a first unit of the first memory device type via a first PtP memory interconnect, and a second portion of the command and address connections are to couple to a second unit of the first memory device type via a second PtP memory interconnect. The selector can selectively couple the command and address signals to the first and second PtP memory interconnects in a mirrored manner. The memory controller is further to communicate a chip select signal and an on-die termination signal on a multi-drop memory interconnect coupled to the first and second units of the first memory device type. A configuration register, which may be controlled by a BIOS setting, may store a mirrored mode setting, where the memory controller is to control the selector responsive to the mirrored memory setting.

The first memory device type can be a memory according to a low power double data rate protocol and the second memory device type a memory according to a double data rate protocol. Each of these memory types can be configured directly on a circuit board or on a memory module.

Another aspect is directed to method including determining if a memory coupled to a processor is operating in a mirrored memory mode; if so, communicating mirrored command and address signals to a first unit of the memory via a first portion of command and address connections of the processor and a first PtP memory interconnect, and communicating the mirrored command and address signals to a second unit of the memory via a second portion of the command and address connections of the processor and a second PtP memory interconnect; and otherwise communicating non-mirrored command and address signals to the first and second units of the memory via at least a portion of the command and address connections and a multi-drop memory interconnect. The method can further include receiving a mode select signal in a memory controller of the processor; storing the mode select signal in a control register of the memory controller; communicating a chip select signal and an on-die termination signal to the first and second units of the memory via a multi-drop memory interconnect.

The method can also include, responsive to determining that the memory is not operating in the mirrored memory mode, communicating the non-mirrored command and address signals to the memory via the first portion of the command and address connections of the processor and the multi-drop memory interconnect, and not communicating the non-mirrored command and address signals to the memory via the second portion of the command and address connections of the processor.

Another aspect is directed to a memory module to operate according to a low power memory protocol, where the memory module includes a plurality of memory devices and is to receive mirrored command signals on a first PtP memory interconnect and a second PtP memory interconnect.

A still further aspect is directed to a system including a multicore processor having a plurality of cores and a memory controller to control communication between the multicore processor and a system memory of a first memory protocol. The memory controller can be configured to send mirrored command and address signals to the system memory via IO connections of the multicore processor allocated to memory signals of a second memory protocol along a first point-to-point PtP interconnect and a second PtP interconnect.

The system memory may be coupled to the multicore processor and include a first memory device to receive the mirrored command and address signals via the first PtP interconnect and a second memory device to receive the mirrored command and address signals via the second PtP interconnect.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-volatile storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a system on a chip (SoC) including a plurality of processor cores and a memory controller to control communication between the SoC and a memory coupled to the memory controller, wherein in a first configuration the memory controller is to send mirrored copies of command and address signals to a first type of memory device via a first portion of a plurality of command and address connections of the SoC to couple to a first unit of the first memory device type via a first point-to-point (PtP) memory interconnect and via a second portion of the plurality of command and address connections to couple to a second unit of the first memory device type via a second PtP memory interconnect and in a second configuration the memory controller is to send non-mirrored control and address signals to a second type of memory device, wherein in the first configuration the memory controller is further to communicate a chip select signal and an on-die termination signal on a multi-drop memory interconnect coupled to the first and second units of the first type of memory device.

2. The apparatus of claim 1, wherein the plurality of command and address connections are to couple to the second type of memory device via the multi-drop memory interconnect.

3. The apparatus of claim 2, wherein the memory controller includes a selector to, in the second configuration, selectively couple the command and address signals to the second type of memory device via the plurality of command and address connections.

4. The apparatus of claim 3, wherein the selector is to selectively couple the command and address signals to the first and second PtP memory interconnects in a mirrored manner.

5. The apparatus of claim 3, further comprising a configuration register to store a mirrored mode setting, wherein the memory controller is to control the selector responsive to the mirrored mode setting.

6. The apparatus of claim 5, wherein the configuration register is to receive the mirrored mode setting from a basic input/output system (BIOS).

7. The apparatus of claim 1, wherein the first type of memory device comprises a first memory according to a low power double data rate protocol and the second type of memory device comprises a second memory according to a double data rate protocol.

8. The apparatus of claim 7, wherein a plurality of units of the first memory device are configured on a memory module.

9. The apparatus of claim 7, wherein a plurality of units of the first type of memory device are configured on a circuit board on which the SoC is configured.

10. A method comprising:
    determining if a memory coupled to a processor is operating in a mirrored memory mode;
    if so, communicating mirrored command and address signals from the processor to a first unit of the memory via a first portion of command and address connections of the processor and a first point-to-point (PtP) memory interconnect, communicating the mirrored command and address signals from the processor to a second unit of the memory via a second portion of the command and address connections of the processor and a second PtP memory interconnect, and communicating a chip select signal and an on-die termination signal to the first and second units of the memory via a multi-drop memory interconnect coupled to the first and second units of the memory; and
    otherwise communicating non-mirrored command and address signals to the memory from the processor via at least a portion of the command and address connections and the multi-drop memory interconnect.

11. The method of claim 10, further comprising receiving a mode select signal in a memory controller of the processor.

12. The method of claim 10, further comprising responsive to determining that the memory is not operating in the mirrored memory mode, communicating the non-mirrored command and address signals to the memory via at least the first portion of the command and address connections of the processor and the multi-drop memory interconnect.

13. An apparatus comprising:
    a memory module to operate according to a low power memory protocol, the memory module including a plurality of memory devices, wherein a first memory device of the memory module is to receive mirrored command signals from a processor on a first point-to-point (PtP) memory interconnect and a second memory device of the memory module is to receive the mirrored command signals from the processor on a second PtP memory interconnect and the first memory device and the second memory device are further to receive a chip select signal and an on-die termination signal from the processor on a multi-drop memory interconnect.

14. A system comprising:
    a multicore processor including a plurality of cores and a memory controller to control communication between the multicore processor and a system memory of a first memory protocol, the memory controller to send mirrored command and address signals to the system memory via input/output (IO) connections of the multicore processor allocated to memory signals of a second memory protocol along a first point-to-point (PtP) interconnect to a first memory device of the system memory and a second PtP interconnect to a second memory device of the system memory, wherein the memory controller is further to communicate a chip select signal and an on-die termination signal on a multi-drop memory interconnect coupled to the first and second memory devices; and
    the system memory coupled to the multicore processor and including the first memory device to receive the mirrored command and address signals via the first PtP interconnect and the second memory device to receive the mirrored command and address signals via the second PtP interconnect and to receive the chip select signal and the on-die termination signal via the multi-drop memory interconnect.

15. The system of claim 14, wherein the first and second memory devices are configured on a memory module coupled to a circuit board including the multicore processor via a memory connector.

* * * * *